United States Patent [19]

Gabra

[11] 4,431,615

[45] Feb. 14, 1984

[54] PROCESS FOR THE RECOVERY OF MAGNESIUM AND/OR NICKEL BY LIQUID-LIQUID EXTRACTION

[75] Inventor: Georges Gabra, Cap-Rouge, Canada

[73] Assignee: Gouvernement du Quebec, Ste-Foy, Canada

[21] Appl. No.: 428,056

[22] Filed: Sep. 29, 1982

[30] Foreign Application Priority Data

Sep. 29, 1981 [CA] Canada .................................. 386906

[51] Int. Cl.$^3$ .......................... C01F 5/42; C01F 11/48; C01G 53/00; C01G 49/00

[52] U.S. Cl. .................................... 423/139; 423/140; 423/150; 423/157; 423/158; 423/512 A; 423/519

[58] Field of Search ................... 423/512 A, 519, 139, 423/150, 140, 157, DIG. 14, 158

[56] References Cited

U.S. PATENT DOCUMENTS 2,778,729 1/1957 Schaufelberger ................... 423/141
3,058,824 10/1962 Illis ................................... 423/561 R
3,666,466 5/1972 Cook ................................... 423/139
4,058,587 11/1977 Nelson ............................. 423/512 R

OTHER PUBLICATIONS

Ritcey et al "Some Aspects of the Extraction of Metal from Acidic Solutions by Kelex 100" *CIM Bulletin*, (21974) pp. 87–92.

Hohashi, *Principles of Extractive of Metallurgy*, vol. 2, Gordon & Breach, NY (1970) pp. 175,176.

*Primary Examiner*—Earl C. Thomas
*Assistant Examiner*—Robert L. Stoll
*Attorney, Agent, or Firm*—Schwartz, Jeffery, Schwaab, Mack, Blumenthal & Koch

[57] ABSTRACT

The recovery of substantially pure magnesium and/or nickel sulphite which is present in a solid starting meterial. The latter is treated with gaseous $SO_2$ in water, the solution obtained is treated by a liquid-liquid extraction, to give an aqueous phase and an organic phase and the magnesium and/or nickel sulphite is recovered from the aqueous phase. With this process, it is possible to obtain a magnesium salt of high purity.

12 Claims, No Drawings

PROCESS FOR THE RECOVERY OF MAGNESIUM AND/OR NICKEL BY LIQUID-LIQUID EXTRACTION

BACKGROUND OF THE INVENTION (a) Field of the Invention

The invention concerns a process for recovering magnesium and/or nickel sulphite by liquid/liquid extraction.

(b) Description of Prior Art

The reaction of gaseous $SO_2$ in the absence of air with a mixture of magnesium, iron, nickel and calcium in the form of oxide or silicate, for example asbestos byproducts, leads to the introduction of a soluble magnesium bisulphite. However, during the solubilization of magnesium, the elements (iron, calcium and nickel) are also solubilized. The purification of the solution of magnesium bisulphite or the separation of valuable elements in pure form, such as nickel, by well known methods, is impossible. The precipitation of the elements such as iron, calcium and nickel from this solution by means of $NH_4OH$, $NH_4OH+H_2S$ or $(NH_4)_2S$ creates problems because the magnesium sulphite also precipitates.

$SO_2$ is produced in large quantities during the smelting of sulphide minerals of copper, lead and zinc. Moreover, it is believed that every year 20 millions of tons of $SO_2$ must be removed from coal and heating oil so as to conform to the requirements of the controls of the quality of air. The recovery of $SO_2$ is not easy. The conversion into sulphuric acid constitutes a solution, as long as a market can be found, which is not always the case. Another approach would be to use $SO_2$ directly for the extraction of metals (magnesium, iron, nickel) which are present in mineral masses, in the form of silicates. Serpentine (an asbestos byproduct) is an example of magnesium silicate.

The reaction of $SO_2$ (without oxygen) with a pulp of asbestos byproducts enables to produce magnesium bisulphite. However, during the solubilization of magnesium, the impurities (iron, calcium, nickel) are also solubilized. The precipitation of the impurities of this solution by means of $NH_4OH$, $NH_4OH+H_2S$ or $(NH_4)_2S$ is possible, but the magnesium sulphite also precipitates. Therefore, this method should not be considered.

Tests for the purification of magnesium by separating the undesirable elements by the known method of precipitating iron and nickel as sulphide in alkaline media have not proved satisfactory because of the simultaneous precipitation of magnesium in the form of sulphite.

Although it is well known to carry out the liquid-liquid extraction of Ni, $Fe^{2+}$, Ca and Mg, the selective extraction of $Ni^{2+}$, $Fe^{2+}$ and Ca of an acid solution of magnesium has never been established.

SUMMARY OF INVENTION

The present invention resides in the solubilizing of magnesium and other elements, such as iron, calcium and nickel, by the reaction of $SO_2$ without oxygen in water and in the separation of the salt of magnesium and/or nickel in substantially pure form by a liquid-liquid extraction.

The invention concerns a process of recovery of the sulphite of magnesium and/or nickel, in substantially pure form, contained in a solid starting material, characterized by treating the starting material with gaseous $SO_2$ in water and in treating the solution obtained by a liquid-liquid extraction, thus obtaining an aqueous phase and an organic phase, and recovering the magnesium and/or sulphite from the aqueous phase.

DESCRIPTION OF PREFERRED EMBODIMENTS

Preferably, the process consists in a liquid-liquid extraction of an acid solution of the mixture of magnesium, iron, calcium and nickel bisulphite with an organic phase which contains a mixture of Di(2 ethyl hexyl phosphoric acid), referred to herein as Di(-2EHPA), Kelex 100 (Trade Mark of Ashland Chemicals which stands for $\beta$-alkenyl 8-hydroxy-quinoline and a solvent such as kerosene. The ratios between the two components preferably vary between 10:10:80 and 5:1:94 in volume. It has been found that the best ratio is 5:1:94 or 5:2:93, depending on the concentration of nickel in the solution.

The Di(2EHPA) is specific for iron and calcium. It has no influence on nickel. Kelex 100 is specific for nickel but it lightly extracts iron and calcium. At a pH lower than 2, the extraction of nickel is negligible. At a pH of 4, this extraction is optimum. The optimum pH for the extraction of iron, nickel and calcium is 3-4.

The loss of magnesium is proportional to its concentration in the original solution. It varies between 2 and 6% by changing the concentration of magnesium from 47 to 75 g/l.

In general, 3 contact steps are sufficient to separate the iron, calcium and nickel from the magnesium.

The recovery of the organic phase after the step of liquid-liquid extraction is carried out by using either sulphurous acid or sulphuric acid 1-4 N. The recovery of nickel from the aqueous phase originating from the recovery of the organic phase (stripping) is possible with known chemical methods.

The invention will now be illustrated without limitation by means of the following examples.

EXAMPLE 1

100 ml of a mother solution (solution A) containing MgO 46.9 g/l, CaO 150 ppm, $Fe_{tot}$ 4.2 g/l, NiO 250 ppm and $SiO_2$ 160 ppm are contacted 3 times with 100 ml of an organic phase, which is composed of 5% Di(-2EHPA), 2% Kelex 100 and 93% kerosene. The analysis of the aqueous phase after the 3 contacts indicates 45.8 g/l MgO, 4 ppm CaO, 10 ppm NiO, 4 ppm $Fe_{tot}$ and 140 ppm $SiO_2$. The aqueous solution is heated at 70° C. during 30 minutes to precipitate the magnesium sulphite. The latter is dried during 12 hours at 100° C. The results of the chemical analysis are the following:

28-32% MgO, 0.04% $Fe_{tot}$, 0.04% NiO, CaO<0.01%, $SiO_2$<0.1% ($MgSO_3 xH_2O$, x=1 or 2).

The chemical analysis of the magnesium sulphite without liquid-liquid extraction is the following:

MgO 28%, $Fe_{tot}$ 2.6%, NiO 0.24%, CaO 0.12% and $SiO_2$<0.1%.

EXAMPLE 2

100 ml of a solution (solution B), containing 75 g/l MgO, 160 ppm CaO, 1.6 g/l $Fe_{tot}$, 193 ppm NiO and 640 ppm $SiO_2$ are contacted 3 times with 100 ml of an organic phase comprising 5% Di(2EHPA), 1% Kelex 100 and 94% kerosene.

The analysis of the aqueous phase after the 3 contacts is the following:

70 g/l MgO, 4.8 ppm NiO, 2 ppm CaO, 4 ppm $Fe_{tot}$ and 600 ppm $SiO_2$.

The aqueous solution is heated at 70° C. during 30 minutes to precipitate the magnesium sulphite. This salt is dried at 100° C. during 12 hours. The chemical analysis of the latter is the following:

32% MgO, 0.04% $Fe_{tot}$, 0.04% NiO, 0.01% CaO and 0.1% $SiO_2$ ($MgSO_3 \cdot xH_2O$, x=1)

The chemical analysis of the magnesium sulphite without the liquid-liquid treatment is the following:
27.1% MgO, 2.1% $Fe_{tot}$, 0.20% NiO, 0.2% CaO and 0.1% $SiO_2$ This process enables to prepare magnesium sulphite with a purity of 95.5%.

Influence of the Variation of the Proportion of Di(2EHPA) and Kelex 100 on the concentration of the impurities in the magnesium sulphite Two series of tests were carried out utilizing various proportions of Di(2EHPA) and Kelex in kerosene for the two leaching solutions, i.e. solution A and solution B.

In this series of tests, the number of contacts and the ratio of the aqueous phase/organic phase were maintained constant, i.e. 3 contacts and O/A=1. The aqueous solution was heated at 70° C. during 30 minutes to precipitate the magnesium sulphite. The results of this study are shown in Tables 1 and 2.

TABLE 1

The influence of the variation of the proportion of Di(2EHPA): Kelex 100: kerosene on the concentration of the impurities in the magnesium sulphite of Solution A

| Ratio of Di (2EHPA): Kelex 100: kerosene Volume | Chemical Analysis of Magnesium Sulphite (%) | | | | | | | | | | | Purity MgO %* |
|---|---|---|---|---|---|---|---|---|---|---|---|---|
| | MgO | $Fe_{tot}$ | NiO | CaO | $Al_2O_3$ | Cu | $SiO_2$ | $Cr_2O_3$ | $SO_3$— | $H_2O_{tot}$ | Color | |
| (original) 0:0:0 | 26 | 2.63 | 0.24 | 0.12 | — | — | <0.1 | 0.04 | — | — | brown | 87 |
| 10:0:90 | 32 | <0.04 | 0.27 | <0.01 | <0.01 | <0.01 | <0.1 | 0.04 | — | — | white | 98.4 |
| 0:10:90 | 27.8 | 2.1 | 0.02 | 0.1 | <0.02 | <0.01 | <0.1 | 0.04 | — | — | yellow | 90.2 |
| 10:1:89 | 30.1 | 0.04 to 0.06 | 0.06 | <0.01 | — | — | <0.1 | 0.04 | 53.5 | 26 | white | 99.1 |
| 5:1:94 | 30.3 | 0.04 | 0.06 | <0.01 | — | — | <0.1 | 0.04 | 52.5 | 28 | white | 99.1 |
| 5:2:93 | 30.1 | 0.04 | 0.04 | <0.01 | — | — | <0.1 | — | 52.8 | 29.1 | white | 99.2 |
| 5:5:90 | 30.2 | 0.04 | 0.02 | <0.01 | <0.02 | — | <0.1 | 0.04 | 50.8 | 30.9 | yellow (pale) | 99.3 |
| 10:10:80 | 29.9 | 0.01 to 0.02 | 0.01 | <0.01 | <0.01 | — | <0.1 | 0.04 | 53.5 | 32.1 | yellow | 99.4 |

*Purity MgO % = $\frac{MgO \%}{(MgO + FeO + NiO + CaO + Al_2O_3 + Cu + SiO_2 + Cr_2O_3) \%} \times 100$

TABLE 2

The influence of the variation of the proportion of Di(2EHPA): Kelex 100: kerosene on the concentration of the impurities in the magnesium sulphite of Solution B

| Ratio of Di (2EHPA): Kelex 100: kerosene Volume | Chemical Analysis of Magnesium Sulphite (%) | | | | | | | | | | | Purity MgO %* |
|---|---|---|---|---|---|---|---|---|---|---|---|---|
| | MgO | $Fe_{tot}$ | NiO | CaO | $Al_2O_3$ | Cu | $SiO_2$ | $Cr_2O_3$ | $SO_3$— | $H_2O_{tot}$ | Color | |
| (original) 0:0:0 | 27.1 | 2.1 | 0.2 | 0.2 | — | — | 0.15 | 0.07 | 50.8 | 32.1 | brown | 89.0 |
| 10:1:89 | 30 | 0.04 | 0.06 | <0.01 | 0.01 | 0.01 | <0.1 | 0.06 | 52.1 | 30.1 | white | 99 |
| 5:1:94 | 32.1 | 0.04 | 0.04 | <0.01 | — | — | <0.1 | — | — | — | white | 99.2 |
| 5:2:93 | 33.1 | 0.04 | 0.04 | <0.01 | — | — | <0.1 | — | 51.9 | 30.8 | white | 99.2 |
| 5:5:90 | 33.9 | 0.04 | 0.03 | <0.01 | — | — | <0.1 | — | 50.1 | 30.1 | yellow (pale) | 99.2 |
| 10:10:80 | 32.1 | 0.01 | 0.01 | <0.01 | — | — | <0.1 | — | 53.1 | 31.6 | yellow | 99.4 |

*Purity MgO % = $\frac{MgO \%}{(MgO + FeO + NiO + CaO + Al_2O_3 + Cu + SiO_2 + Cr_2O_3) \%} \times 100$

Regeneration of the organic phase (stripping)

The regeneration of the organic phase after the step of liquid-liquid extraction has been studied by utilizing either sulphurous acid 1 N or sulphuric acid 4 N in a ratio O/A=10. Three contacts with sulphurous acid and two contacts with sulphuric acid are sufficient to free the organic phase of the extracted metals during the liquid-liquid extraction. The regenerated organic phase has been used again for the liquid-liquid extraction of another charge comprising a leaching solution. These series of tests have been repeated three times to study the efficiency of the regenerated organic phase. The leaching solution after liquid-liquid extraction with the new or regenerated organic phase has been heated to precipitate the magnesium sulphite in order to determine the concentration of the impurities. The results are given in Table 3.

TABLE 3

The effect of the regeneration of the organic phase on the concentration of the impurities in the magnesium sulphite

| Type of organic phase | Chemical Analysis of Magnesium sulphite (%) | | | | | | | |
|---|---|---|---|---|---|---|---|---|
| | MgO | NiO | $Fe_t$ | CaO | $Al_2O_3$ | $Cr_2O_3$ | $SiO_2$ | $MnO_2$ |
| new | 34.7 | 0.03 | 0.04 | <0.01 | <0.02 | <0.04 | <0.01 | <0.01 |
| regenerated for the 1st time | 34.0 | 0.02 | 0.03 | <0.01 | <0.02 | <0.04 | <0.01 | <0.01 |
| regenerated for the 2nd time | 33.9 | 0.02 | 0.04 | <0.01 | <0.02 | <0.04 | <0.1 | <0.01 |
| regenerated for the 3rd time | 34.5 | 0.02 | 0.03 | <0.01 | <0.02 | <0.04 | <0.1 | <0.01 |

Table 3 shows the results of the influence of the regeneration of the organic phase (stripping) on the concentration of the impurities contained in the magnesium sulphite. They clearly indicate that the efficiency of the extraction by the solvents in question does not decrease up to the third regeneration. No variation was found in the concentration of the impurities contained in the magnesium sulphite by utilizing either the new or regenerated organic phase.

I claim:

1. Process which comprises treating a starting material containing magnesium and impurities comprising iron, calcium and nickel, with gaseous $SO_2$ in water to produce an aqueous solution containing Ni, $Fe^{2+}$, Ca and Mg, subjecting the solution obtained to a liquid-liquid extraction by carrying out three contact stages between the aqueous phase and an organic phase, thereby removing iron, calcium and nickel from the aqueous phase and allowing said iron, calcium and nickel to pass into said organic phase, and recovering magnesium from said aqueous phase.

2. Process according to claim 1, wherein the liquid-liquid extraction is carried out by means of an organic phase comprising di (2 ethyl hexyl phosphoric acid),β-alkenyl-8-hydroxyquinoline, and kerosene.

3. Process according to claim 2, wherein the proportion of di (2 ethyl hexyl phosphoric acid),β-alkenyl-8-hydroxyquinoline and kerosene is between 10:10:80 and 5:1:94 in volume.

4. Process according to claim 3, wherein the proportion of di (2 ethyl hexyl phosphoric acid),β-alkenyl-8-hydroxyquinoline and kerosene is 5:2:93.

5. Process according to claim 3, wherein the proportion of di (2 ethyl hexyl phosphoric acid), β-alkenyl-8-hydroxyquinoline and kerosene is 5:1:94.

6. Process according to claims 4 or 5, wherein the aqueous phase has a pH between 2 and 4.

7. Process according to claims 4 or 5, wherein the pH is 4.

8. Process according to claim 7, which comprises regenerating the organic phase by contacting the latter with sulphurous acid.

9. Process according to claim 8, which comprises recovering from the aqueous phase the Ni resulting from a re-extraction of the organic phase.

10. Process according to claim 8, which comprises recycling the organic phase regenerated for further extraction of iron, calcium and nickel.

11. Process according to claim 7, which comprises regenerating the organic phase by contacting the latter with sulphuric acid 1 to 4 N.

12. Process according to claim 1, which comprises recovering magnesium sulphite having a 99.5% purity from the aqueous phase.

* * * * *